United States Patent
Burgan et al.

(10) Patent No.: US 7,499,733 B2
(45) Date of Patent: Mar. 3, 2009

(54) MOBILE COMMUNICATION DEVICE AND METHOD OF HIBERNATING AND PREBOOTING SAME TO REDUCE START UP TIME

(75) Inventors: John M. Burgan, North Palm Beach, FL (US); Joseph Patino, Pembroke Pines, FL (US); Marco Pulido, Miramar, FL (US)

(73) Assignee: Motorola, Inc., Schaumburg, IL (US)

( * ) Notice: Subject to any disclaimer, the term of this patent is extended or adjusted under 35 U.S.C. 154(b) by 428 days.

(21) Appl. No.: 11/315,073

(22) Filed: Dec. 22, 2005

(65) Prior Publication Data

US 2007/0149256 A1 Jun. 28, 2007

(51) Int. Cl.
*H04B 1/38* (2006.01)
(52) U.S. Cl. .................... 455/574; 455/127.5
(58) Field of Classification Search ........... 455/574, 455/127.5, 343.1–2
See application file for complete search history.

(56) References Cited

U.S. PATENT DOCUMENTS

| | | | |
|---|---|---|---|
| 6,654,890 B1 * | 11/2003 | Girard | 726/35 |
| 2002/0174353 A1 * | 11/2002 | Lee | 713/193 |
| 2004/0128493 A1 * | 7/2004 | Zimmer et al. | 713/1 |
| 2006/0194624 A1 * | 8/2006 | Hsieh et al. | 455/574 |
| 2006/0205443 A1 * | 9/2006 | Simoens et al. | 455/574 |
| 2007/0101077 A1 * | 5/2007 | Evanchik et al. | 711/162 |

* cited by examiner

*Primary Examiner*—CongVan Tran
(74) *Attorney, Agent, or Firm*—Randall S. Vaas

(57) ABSTRACT

A mobile communication device (100) includes a volatile memory (110) and a non-volatile memory (112). Instruction code for operating the mobile communication device is permanently stored in the non-volatile memory, and copied to the volatile memory for execution. The mobile communication device enters a hibernate mode which involves shutting down most of the mobile communication device except power to the volatile memory, which allows a nearly instant apparent start up of the mobile communication device at a later time.

18 Claims, 5 Drawing Sheets

US 7,499,733 B2

MOBILE COMMUNICATION DEVICE AND METHOD OF HIBERNATING AND PREBOOTING SAME TO REDUCE START UP TIME

TECHNICAL FIELD

This invention relates in general to mobile communication devices, and more particularly to reducing the apparent start up latency of the mobile communication device.

BACKGROUND OF THE INVENTION

Mobile communication devices are in widespread use throughout the world and in metropolitan regions in particular. Mobile communication devices have become so common in many areas that it is often presumed tat a given person in such regions will have a mobile communication device. To remain competitive, manufactures have added features to mobile communication devices to attract customers to their products. Mobile communication devices are now sophisticated enough to have operating systems, JAVA support, internet browsers, and so on. A consequence of this sophistication is that a mobile communication device may require a significant period of time to start up from being powered off. At the least, this start up time can be an annoyance, but in an emergency, it can be critical. Therefore, there is a need to be able to start up a mobile communication device in a rapid manner that is virtually instantaneous.

DETAILED DESCRIPTION

Figure 1:
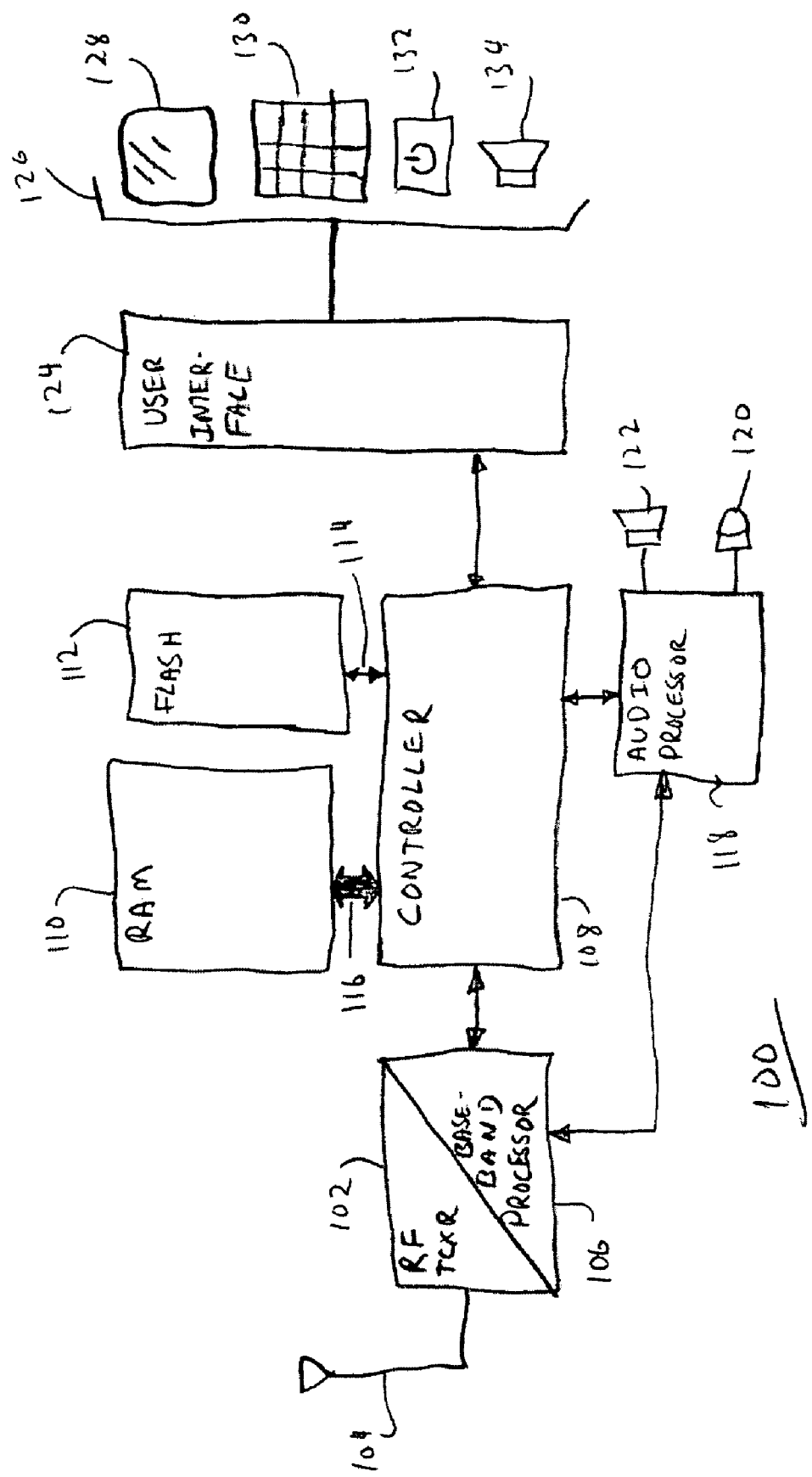
FIG. 1 shows a block schematic diagram of a mobile communication device, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of long start up time of the mobile communication device by use of a hibernate mode where, for example, the state of the mobile communication device may be preserved in a volatile memory of the mobile communication device by maintaining power to the volatile memory while shutting off other portions of the mobile communication device so that the mobile communication device appears to be off. As a result, the hibernate mode draw less power than an idle mode of the mobile communication device. The mobile communication device may also pre-boot itself when off, if a scheduled start up time is known. Likewise, the mobile communication device can set itself into the hibernate mode from an active mode at a scheduled time. Otherwise, the hibernate mode may be initiated by the user upon pressing the on/off button of the mobile communication device.

Referring now to FIG. 1, there is shown a block schematic diagram of a mobile communication device 100, in accordance with an embodiment of the invention. The mobile communication device 100 contains a radio frequency (RF) transceiver 102 coupled to an antenna 104. The RF transceiver 102 performs all radio frequency operations, including modulation, demodulation, filtering, amplification, and so on. The antenna 104 is used for both transmitting signals and receiving signals over an air interface. The RF transceiver 102 is closely coupled to a baseband processor 106 which processes digital information received and demodulated by the RF transceiver 102, and prepares digital information for modulation and transmission by the RF transceiver 102. Overall operation of the mobile communication device 100 is controlled by a controller 108. The controller 108 operates according to instruction code in a volatile memory 110, such as a random access memory (RAM). However, being a volatile memory 110, information in the volatile memory 110 will not persist once power is removed from the memory 110. The instruction code may be stored in a non-volatile memory 112 such as a flash memory. Upon powering up the mobile communication device 100, the controller 108 must copy the instruction code from the non-volatile memory 112 to the volatile memory 110. Typically, this is performed over a serial link 114 between the non-volatile memory 112 and the controller 108. The link between the controller 108 and the volatile memory 110 is typically a parallel bus 116. To facilitate voice communication, the mobile communication device 100 further comprises an audio processor 118. The audio processor 118 converts acoustic audio signals received at a microphone 120 into digital form for the baseband processor 106. Similarly, digital audio signals received from the baseband processor 106 are converted to analog audio signals to be played over a speaker 122, such as an earpiece. The mobile communication device 100 interacts with a user via a user interface 124. Although shown abstracted here as a single block, it will be appreciated by those skilled in the art there are a variety of circuits and circuitry included in the user interface 124, such as display drivers, filters, keypad circuits, debounce circuits, software detection of button presses, and so on. The mobile communication user interface 124 operates via a number of interface devices 126, including, for example, one or more graphical displays 128, a keypad and other buttons 130, including a power on/off button 132, and audio components 134. All portions of the mobile communication device 100 are capable of power control, being put into low power states, powered on or off, as necessary. For example, a controller 108 can put itself into a low power mode and is periodically awakened by an external interrupt clock. Various switches can control power to other parts of the mobile communication device 100 as well.

Figure 2:
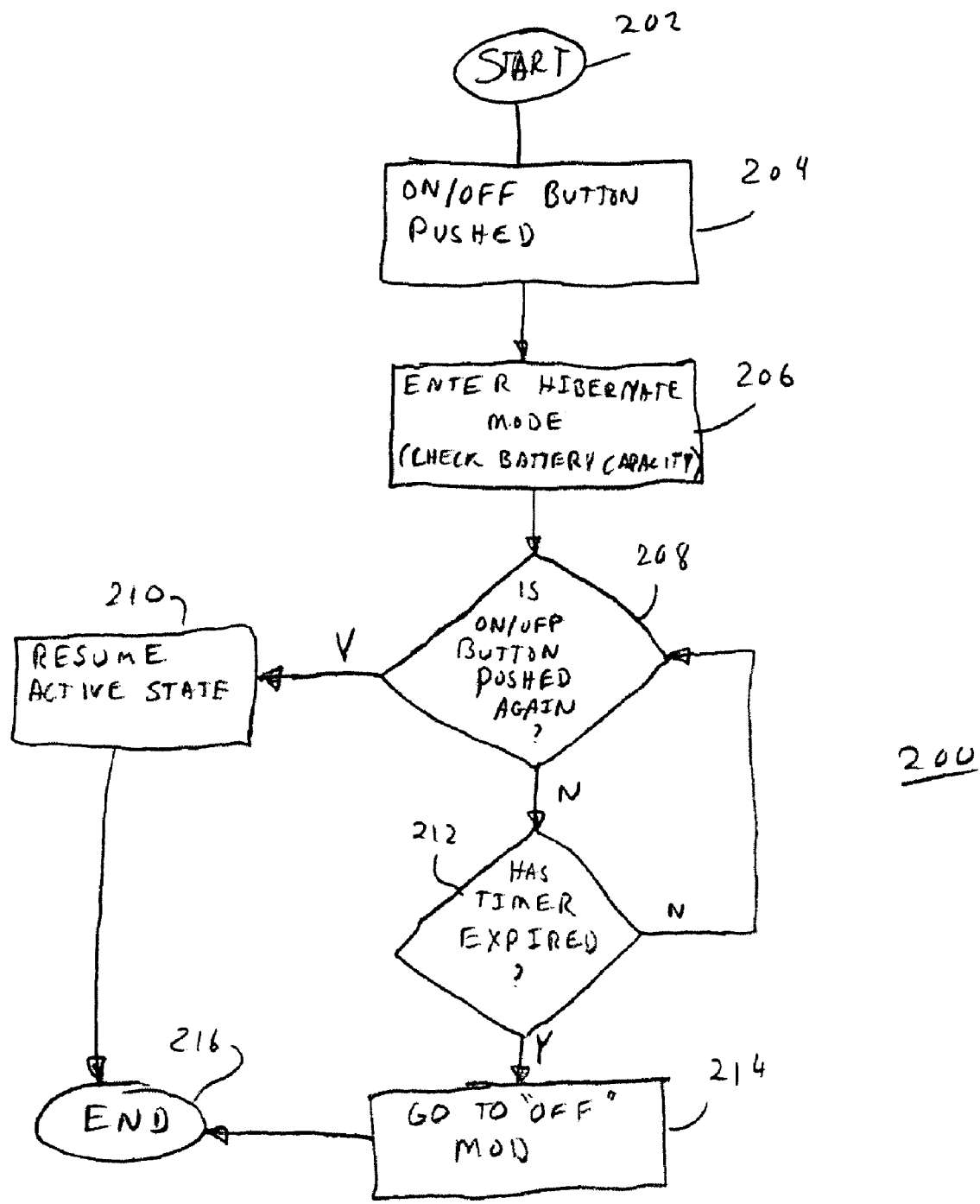
FIG. 2 shows a flow chart of a method of operating a mobile communication device, in accordance with an embodiment of the invention.

Referring now to FIG. 2, there is shown a flow chart diagram 200 of a method of operating a mobile communication device, in accordance with an embodiment of the invention. At the start 202 of the method, the mobile communication device is operating in an active mode, meaning the mobile communication device is conventionally powered up, ready to send and receive RF signals and interact with a user of the mobile communication device. At some point in time, the user decides to turn off the mobile communication device, and presses an on/off button 204, for example. However, rather than shutting down the mobile communication device to an off mode, where information in the volatile memory is lost, the mobile communication device enters a hibernate mode 206. The hibernate mode is characterized by a preservation of a present state of the mobile communication device by continuing to provide power to the volatile memory, and the mobile communication device has the appearance of being turned off. That is, the graphical display is turned off along with any light sources, and the mobile communication device doesn't send or receive RF signals. The mobile communication device then periodically checks to see if the on/off button is subsequently pushed 208. This may be monitored with an external free running interrupt circuit as is conventional. Upon detecting actuation of the on/off button, the mobile communication device immediately powers up the graphical display and other portions of the mobile communication device, recommences RF communication with a communication system, and resumes 210 operation from the last active state as preserved in the volatile memory. Upon resumption of active operation by the mobile communication device, the method ends 216. However, it is contemplated that, in addition to checking the on/off button, the mobile communication device may initiate a hibernate timer for timing a hibernate period. Alternatively, upon entering the hibernate mode 206, the mobile communication device may check the battery capacity to determine a hibernate time period. While in the hibernate mode, the mobile communication device checks to see if the hibernate timer has expired 212. If it has, then the mobile communication device simply goes to a conventional off mode 214 where the volatile memory is shut off, and the information in the volatile memory will be lost. The hibernate time may be set for maximum hibernate time period, as determined by the user or the manufacturer of the mobile communication device, or it may be shortened if the remaining battery capacity is below a preselected threshold, which may also be selected by the user or set by the manufacturer. It is also contemplated that the shortened time period may correspond to the remaining battery capacity. The lower the remaining battery capacity, the shorter the hibernate time period.

Figure 3:
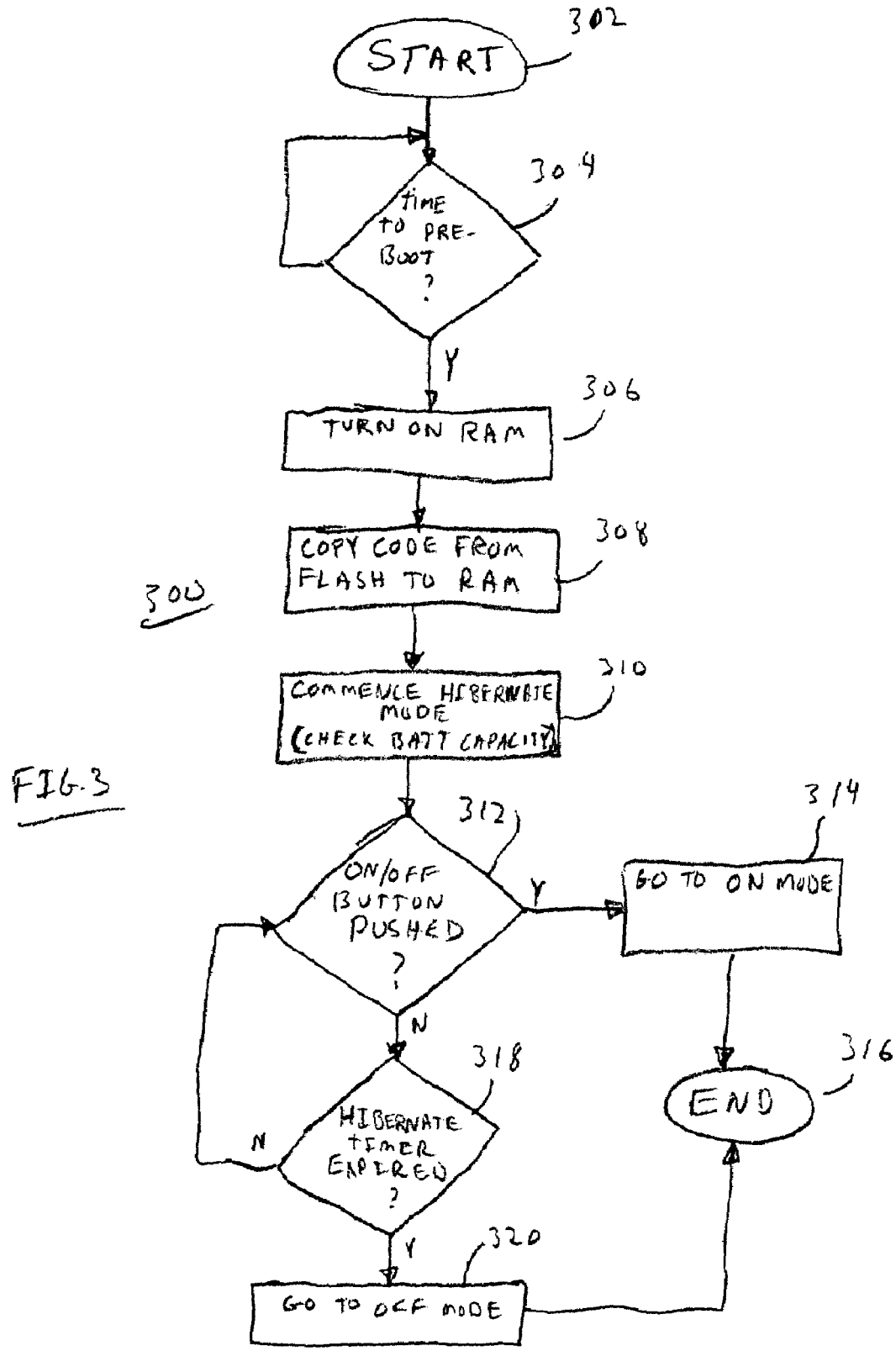
FIG. 3 shows a flow chart diagram of a method of pre-booting a mobile communication device, in accordance with an embodiment of the invention.

Referring now to FIG. 3, there is shown a flow chart diagram of a method of pre-booting a mobile communication device, in accordance with an embodiment of the invention. At the start 302, the mobile communication device is in an off mode, but periodically checks to see if the onset of scheduled start up is approaching, or has arrived 304. The start up time may be selected by the user, and programmed into the mobile communication device, or the mobile communication device may learn a usage pattern of the user, and predict the scheduled turn on time. Once the mobile communication device has determined that the scheduled turn on time has arrived or is imminent, the mobile communication device commences powering up the volatile memory 306 and then copying instruction code from the non-volatile memory to the volatile memory 308. Once the mobile communication device has finished copying the necessary code, the mobile communication device is in hibernate mode 310. While in hibernate mode, the mobile communication device checks the on/off button to detect an actuation of the on/off button 312. When actuation of the on/off button is detected while in the hibernate mode, the mobile communication device will transition to the on or active mode 314, and normal operation proceeds, ending the method 316. While in the hibernate mode, the mobile communication device may run a hibernate timer 318, based either on a preselected maximum hibernate time period or a shortened hibernate time period, as discussed in reference to FIG. 2. If the hibernate time period expires while in the hibernate mode, the mobile communication device will revert to the off mode 320, terminating the method.

Figure 4:
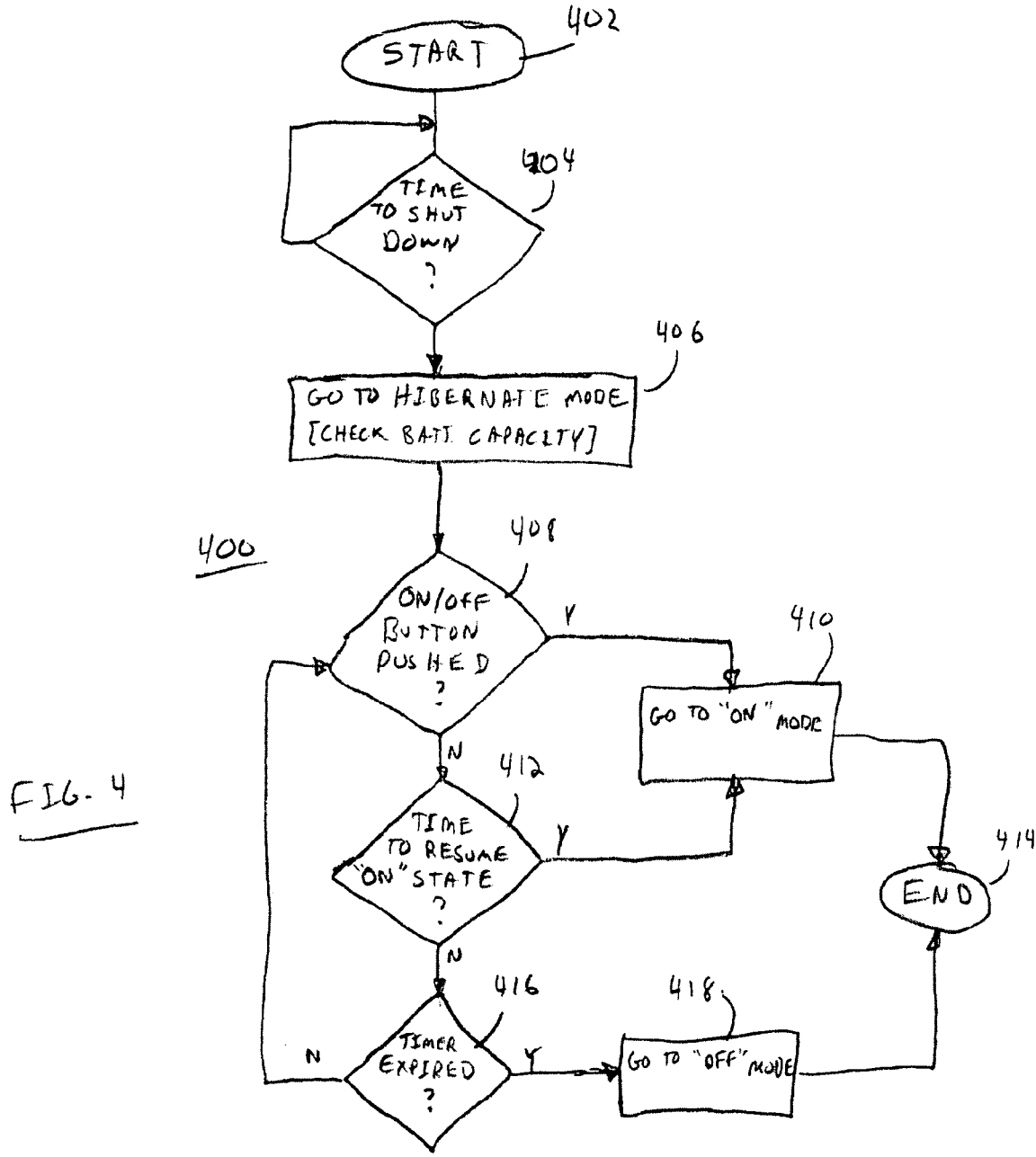
FIG. 4 shows a method of reducing an apparent start up latency of a mobile communication device, in accordance of the invention.

Referring now to FIG. 4, there is shown a flow chart diagram 400 of a method of reducing an apparent start up latency of a mobile communication device, in accordance of the invention. At the start 402 of the method, the mobile communication device is operating in an on or active mode, able to receive and transmit RF signals and interact with a user. At some point while in the active mode, a scheduled turn off or shut down time 404 occurs. In response, the mobile communication device places itself in the hibernate mode 406, as in FIGS. 2-3. The present method embodiment anticipates a regular time usage pattern of the mobile communication device by a user, and appears to turn off and on at scheduled or otherwise appropriate times, but retaining the ability to turn on instantly in case of an emergency or an exception to the schedule. While in the hibernate mode, the mobile communication device checks for actuation of the on/off button 408, as in FIGS. 2-3. If the on/off button is pressed, the mobile communication device resumes normal operation 410, and the method terminates 414. Alternatively, while in the hibernate mode, if a scheduled turn on time occurs 412, the mobile communication device will also leave the hibernate mode and go to the active mode 410. The mobile communication device in the present method embodiment may also run a hibernate timer with one of several different time values corresponding to the remaining battery capacity. If the hibernate timer expires 416, the mobile communication device will go to the off mode 418 to avoid draining the battery.

Figure 5:
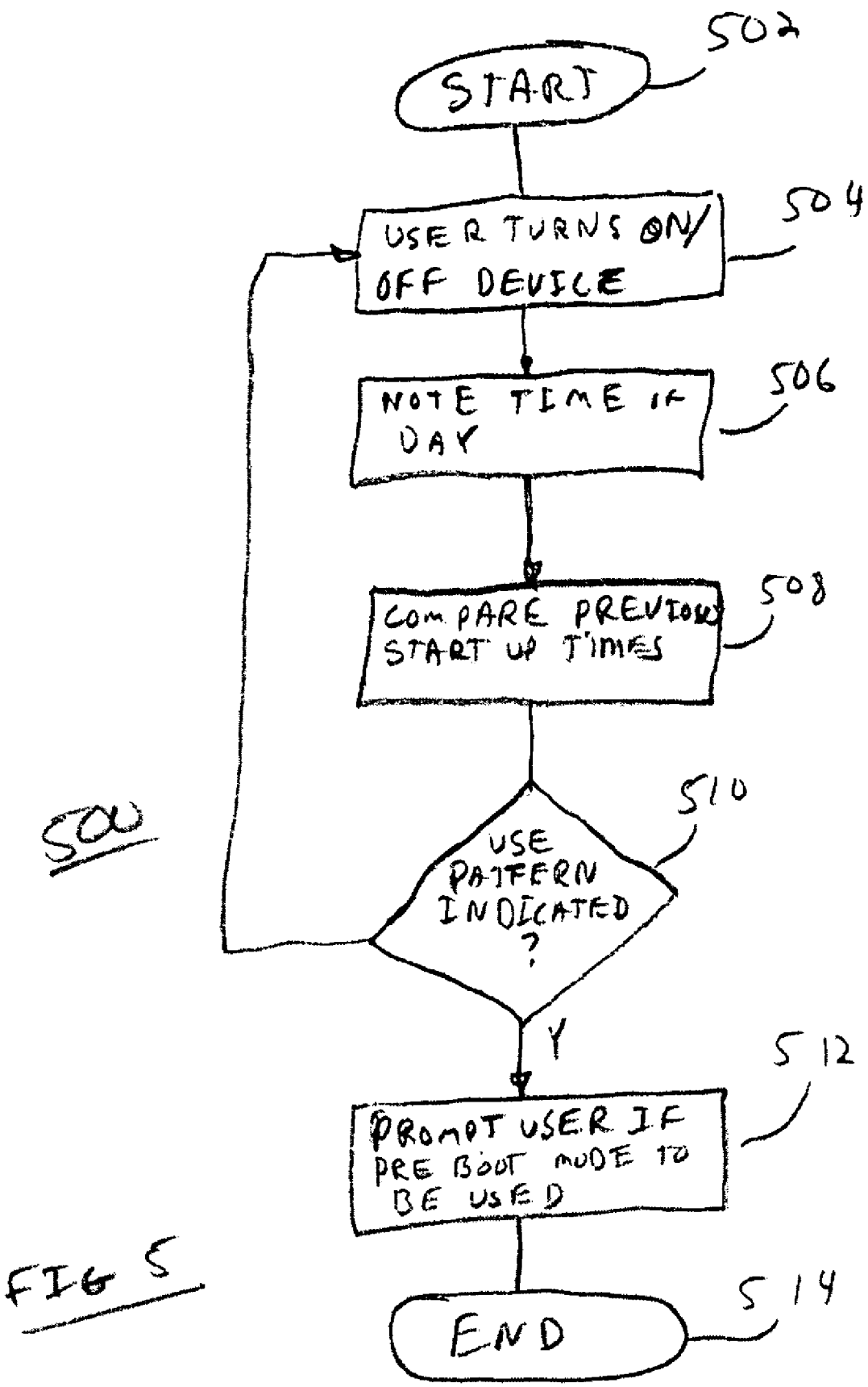
FIG. 5 shows a method of learning a usage pattern of the mobile communication device for implementing an automatic pre-boot mode or hibernate mode, in accordance with an embodiment of the invention.

Referring now to FIG. 5, there is shown a flow chart diagram 500 of a method of learning a usage pattern of the mobile communication device for implementing an automatic pre-boot mode or hibernate mode, in accordance with an embodiment of the invention. At the start 502, the mobile communication device has no information as to the usage pattern of the user. Each time the user turns on or off the mobile communication device 504, the mobile communication device notes the time of the turn on or turn off event 506. The mobile communication device then compares the times of preceding similar events 508 to determine if a use pattern is indicated 510. If a use pattern is indicated by the turn on or turn off history of use, the mobile communication device may prompt the user 512 to allow automatic turn on or turn off using the hibernate or pre-boot methods discussed in reference to FIGS. 2-4.

Thus, the invention provides a method for reducing an apparent boot time of a mobile communication device. The mobile communication device has a power on/off button, and the method commences by, while the mobile communication device is in an active mode, detecting actuation of the on/off button. When actuation is detected, the mobile communication device commences entering a hibernate mode. The hibernate mode includes placing the mobile communication device in a low power state so as to appear to be powered off, and maintaining a volatile memory of the mobile communication device containing instruction code copied from a non-volatile memory of the mobile communication device in a powered state to preserve the last active state of the mobile communication device in the volatile memory. While in the hibernate mode, the mobile communication device monitors the on/off button, and upon detection of actuation of the on/off button while in the hibernate mode, resumes the active mode in the last active state as preserved in the volatile memory. While in the hibernate mode, the mobile communication device may run a hibernate timer, and if the timer expires before the user reactivates the mobile communication device by pressing the on/off button, the mobile communication device shuts off by going to an off mode where information in the volatile memory is lost. The duration of the hibernate mode may be a preselected maximum time, or it may be dependent on remaining battery capacity. If the mobile communication device shuts off after expiration of the hibernate period, it may detect the onset of a scheduled turn on time, at which time the mobile communication device may pre-boot, waiting for the user to resume normal operation. Pre-booting is essentially placing the mobile communication device in a hibernate mode from an initial state, rather than a last active state. The benefit of hibernate mode is that the mobile communication device appears to turn on much faster than from the off mode. The pre-boot process may also be used as a regularly scheduled event, rather than in response to a previous expiration of the hibernate timer. The mobile communication device may use hibernate mode at scheduled times, indicated by user input, or by usage pattern.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for reducing a boot time of a mobile communication device, the mobile communication device having a power button, the method comprising:
   while the mobile communication device is in an active mode, detecting actuation of the power button;
   entering a hibernate mode in which the mobile communication device is placed in a low power state so as to appear to be powered off, a volatile memory of the mobile communication device containing instruction code copied from a non-volatile memory of the mobile communication device is maintained in a powered state to preserve a last active state of the mobile communication device in the volatile memory, and a hibernate timer is commenced for timing a hibernate time period;
   monitoring the power button while in the hibernate mode;
   upon detection of actuation of the power button while in the hibernate mode, resuming the active mode in the last active state as preserved in the volatile memory, and
   upon expiration of the hibernate time period without prior detection of actuation of the power button, shutting off at least the volatile memory.

2. The method of claim 1, further comprising:
   upon entering the hibernate mode, checking a remaining battery capacity of a battery of the mobile communication device; and
   setting the hibernate time period based on the remaining battery capacity.

3. The method of claim 2, further comprising:
   while the volatile memory is shut off, detecting a scheduled start up time;
   pre-booting the mobile communication device by powering the volatile memory and the non-volatile memory;
   copying instruction code from the non-volatile memory to the volatile memory;
   initializing the mobile communication device in the hibernate mode;
   monitoring the power button while in the hibernate mode; and
   upon detection of actuation of the power button while in the hibernate mode resuming the active mode in the last active state as stored in the volatile memory.

4. The method of claim 3, wherein copying instruction code is performed over a serial interface between the non-volatile memory and the volatile memory.

5. A method of pre-booting a mobile communication device having operating code stored in a non-volatile memory of the mobile communication device, the method comprising:
   detecting a scheduled start up time;
   powering a volatile memory of the mobile communication device responsive to detecting the scheduled start up time;
   copying instruction code from the non-volatile memory to the volatile memory subsequent to powering the volatile memory;
   initializing a hibernate mode of the mobile communication device subsequent to coping the instruction code;
   monitoring a power button of the mobile communication device while the mobile communication device is in the hibernate mode;
   upon detection of an actuation of the power button while in the hibernate mode commencing operation of the mobile communication device in an active mode corresponding to the instruction code;
   determining whether the mobile communication device has been in the hibernate mode for a hibernate time period; and
   if, prior to detection of actuation of the power button, the mobile communication device has been in the hibernate mode for the hibernate time period, shutting off at least the volatile memory.

6. The method of claim 5, further comprising:
   upon entering the hibernate mode, checking a remaining battery capacity of a battery of the mobile communication device; and
   setting the hibernate time period based on the remaining battery capacity.

7. The method of claim 5, wherein the scheduled start up time is provided by a user of the mobile communication device.

8. The method of claim 5, wherein the scheduled start up time is determined based on a usage pattern of the mobile communication device.

9. The method of claim 8, wherein the scheduled start up time is differentiated between weekdays and weekends.

10. The method of claim 5, wherein copying instruction code is performed over a serial interface between the non-volatile memory and the volatile memory.

11. A method of reducing a start up time of a mobile communication device, the method comprising:
    while the mobile communication device is in an active mode, detecting a scheduled turn off time;
    upon detection of the scheduled turn off time, entering a hibernate mode in which the mobile communication device is placed in a low power state so as to appear to be powered off, a volatile memory of the mobile communication device containing instruction code copied from a non-volatile memory of the mobile communication device is maintained in a powered state to preserve a last active state of the mobile communication device in the volatile memory, and a hibernate timer is commenced for timing a hibernate time period;
    while in the hibernate mode and upon detection of one of a scheduled start up time and actuation of a power button of the mobile communication device, resuming the active mode in the last active state as preserved in the volatile memory; and upon expiration of the hibernate time period without prior detection of one of a scheduled start up time and actuation of the power button, shutting off at least the volatile memory.

12. The method of claim 11, further comprising:
determining the scheduled turn off time and the scheduled start up time based on a usage pattern of the mobile communication device.

13. The method of claim 12, wherein the scheduled start up time and the scheduled turn off time are differentiated between weekdays and weekends.

14. The method of claim 11, wherein the scheduled start up time and the scheduled turn off time are provided by a user of the mobile communication device.

15. The method of claim 11, further comprising:
upon entering the hibernate mode, checking a remaining battery capacity of a battery of the mobile communication device; and
setting the hibernate time period based on the remaining battery capacity.

16. The method of claim 15, further comprising:
while the volatile memory is shut off, detecting an onset of the scheduled start up time;
powering the volatile memory of the mobile communication device;
copying instruction code from the non-volatile memory to the volatile memory;
initializing the hibernate mode of the mobile communication device;
commencing the hibernate timer for timing the hibernate time period;
monitoring the power button while in the hibernate mode;
if the power button is actuated while in the hibernate mode and prior to expiration of the hibernate period, commencing operation of the mobile communication device in an active mode; and
if the hibernate timer expires before the power button is actuated, shutting off the volatile memory and placing the mobile communication device in an off mode.

17. A mobile communication device comprising:
a power button;
a non-volatile memory operable to store instruction code;
a volatile memory operable to store the instruction code as copied from the non-volatile memory; and
a controller operably coupled to the power button, the volatile memory and the non-volatile memory, the controller operable to:
copy the instruction code from the non-volatile memory to the volatile memory while the mobile communication device is in an active mode,
detect actuation of the power button while the mobile communication device is in the active mode,
upon detection of actuation of the power button while the mobile communication device is in the active mode, cause the mobile communication device to enter a hibernate mode in which the mobile communication device is placed in a low power state so as to appear to be powered off, the volatile memory is maintained in a powered state to preserve a last active state of the mobile communication device, and a hibernate timer is commenced for timing a hibernate time period,
monitor the power button while the mobile communication device is in the hibernate mode,
upon detection of actuation of the power button while the mobile communication device is in the hibernate mode, resume the active mode in the last active state as preserved in the volatile memory, and
upon expiration of the hibernate time period without prior detection of actuation of the power button, shut off at least the volatile memory.

18. The mobile communication device of claim 17, further comprising a battery, wherein the controller is further operable to:
check a remaining battery capacity of the battery; and
set the hibernate time period based on the remaining battery capacity.

* * * * *